US008397176B2

(12) United States Patent
Subramanian et al.

(10) Patent No.: US 8,397,176 B2
(45) Date of Patent: Mar. 12, 2013

(54) DOCKABLE DROP-DOWN DIALOGS

(75) Inventors: Ramesh Subramanian, Gloucester (CA); Stephen Mereu, Orleans (CA); Robert Reid, Nepean (CA)

(73) Assignee: Corel Corporation, Ottawa (CA)

( * ) Notice: Subject to any disclaimer, the term of this patent is extended or adjusted under 35 U.S.C. 154(b) by 761 days.

(21) Appl. No.: 10/200,373

(22) Filed: Jul. 22, 2002

(65) Prior Publication Data

US 2003/0210274 A1 Nov. 13, 2003

(30) Foreign Application Priority Data

May 7, 2002 (CA) .................................... 2385224

(51) Int. Cl.
*G06F 3/048* (2006.01)

(52) U.S. Cl. ........ 715/809; 715/711; 715/769; 715/799; 715/798; 715/810; 715/842

(58) Field of Classification Search ............... 715/809, 715/842, 810, 798–799, 769, 711
See application file for complete search history.

(56) References Cited

U.S. PATENT DOCUMENTS

| | | | | | |
|---|---|---|---|---|---|
| 4,931,783 | A | * | 6/1990 | Atkinson | 345/163 |
| 5,230,063 | A | * | 7/1993 | Hoeber et al. | 715/840 |
| 5,625,783 | A | * | 4/1997 | Ezekiel et al. | 719/320 |
| 5,715,415 | A | * | 2/1998 | Dazey et al. | 715/708 |
| 5,867,162 | A | | 2/1999 | O'Leary et al. | 345/352 |
| 5,870,091 | A | * | 2/1999 | Lazarony et al. | 715/804 |
| 5,914,714 | A | | 6/1999 | Brown | 345/339 |
| 5,977,973 | A | * | 11/1999 | Sobeski et al. | 715/798 |
| 5,986,657 | A | * | 11/1999 | Berteig et al. | 715/792 |
| 6,002,402 | A | * | 12/1999 | Schacher | 715/810 |
| 6,118,451 | A | | 9/2000 | Alexander | 345/356 |
| 6,208,340 | B1 | | 3/2001 | Amin et al. | 345/339 |
| 6,219,032 | B1 | | 4/2001 | Rosenberg et al. | 345/157 |
| 6,252,594 | B1 | | 6/2001 | Xia et al. | 345/341 |
| 6,433,801 | B1 | * | 8/2002 | Moon et al. | 715/840 |
| 7,024,658 | B1 | * | 4/2006 | Cohen et al. | 717/117 |
| 7,216,303 | B2 | * | 5/2007 | Aggarwal et al. | 715/825 |
| 2002/0070977 | A1 | * | 6/2002 | Morcos et al. | 345/810 |
| 2003/0035012 | A1 | * | 2/2003 | Kurtenbach et al. | 345/810 |
| 2004/0095397 | A1 | * | 5/2004 | Nojima et al. | 345/838 |
| 2004/0237049 | A1 | * | 11/2004 | Pletcher et al. | 715/760 |
| 2005/0027802 | A1 | * | 2/2005 | Madsen et al. | 709/204 |
| 2007/0250793 | A1 | * | 10/2007 | Miura et al. | 715/810 |
| 2008/0216014 | A1 | * | 9/2008 | Kurtenbach et al. | 715/808 |
| 2010/0070918 | A1 | * | 3/2010 | Kho | 715/810 |

OTHER PUBLICATIONS

Fowler, Susan, GUI Design Handbook, McGraw-Hill, 1998, p. 138-139.*
Microsoft, The Windows Interface Guidelines for Software Design, Microsoft Press, 1995, p. 174-175.*
Powerful screen capture software—HyperSnap-DX, Feb. 4, 2002, Hyperionics, p. 1-3 For the Feb. 4, 2002 date using Internet Archive Way Back Machine: http://web.archive.org/web/20020204170447/http://www.hyperionics.com/hsdx.*

* cited by examiner

*Primary Examiner* — Doon Chow
*Assistant Examiner* — Linh K Pham
(74) *Attorney, Agent, or Firm* — Patterson & Sheridan LLP

(57) ABSTRACT

A user interface dialog is provided. The user interface dialog comprises tear-off functionality for being torn-off from a drop-down selection, and docking functionality for docking onto a docker.

16 Claims, 8 Drawing Sheets

DOCKABLE DROP-DOWN DIALOGS

FIELD OF THE INVENTION

This invention relates generally to the field of software user interface design and specifically to the field of providing flexible accessibility to dialogs.

BACKGROUND TO THE INVENTION

Dialog boxes in a typical windowing software user interface are generally invoked, placed on the screen, used, and then dismissed. There are two types of dialogs: modal and modeless. A modal dialog requires the user to close the dialog before continuing to work in the application, whereas the modeless dialog allows the dialog to remain visible while the user continues to work in the application. In either case the general usage remains the same, even though the modeless dialog offers the flexibility of remaining present while the user continues to work. This style of dialog which floats on top or foreground of the rest of the application has several disadvantages.

One disadvantage to this style of floating dialog includes the fact that the dialog is typically placed near the center of the screen concealing the work area. Another disadvantage is that the placement of the dialog is arbitrary relative to where it was invoked from, forcing the user to move their mouse as well as their attention to a different region of the screen. Another disadvantage is that the dialog must be explicitly closed with an additional click after use. Another disadvantage is that the dialog does not stay in one place relative to the application frame when moved or resized and does not make optimal use of working space.

Parts of the problem described above have been addressed with the utilization of dockable dialogs and drop-down dialogs. However, neither of these solutions address the entire problem.

A dockable dialog is a modeless dialog which when docked, fixes itself to a designated area of the application's work area, such as an edge. This designated area of the application work area is called a docker. The docker may be a location in a window of the application environment. A dockable dialog may be removed from the docker and float in another location of the window. Dockable dialogs floating in a window of an application framework may be docked on a docker.

In a different solution, drop-down dialogs are used. The drop-down dialogs may come in the form of flyout (or drop-down) toolbars and menus, placed adjacent to their corresponding flyout button minimizing mouse and eye movement. Dropdown dialogs may be automatically dismissed when a user clicks on a part of the application's work area away from the flyout toolbar. The drop-down dialog may be torn-off from the flyout button and float in a window of the application environment.

Traditional dockable dialogs and drop-down dialogs do not communicate with each other. A traditional drop-down dialog cannot dock on a docker. Thus, users are limited to having either a drop-down dialog or a docking dialog. Using both types of dialogs simultaneously may take up limited window space in the application framework. As the simultaneously running dialogs do not communicate with each other, users may confuse a floating drop-down dialog with a floating dockable dialog. Furthermore, users may experience frustration when an attempt to dock a drop-down dialog fails.

SUMMARY OF THE INVENTION

The invention allows for a dialog which is capable of dropping-down and docking.

In an embodiment of the present invention, there is provided a user interface dialog comprising tear-off functionality for being torn-off from a drop-down selection, and docking functionality for docking onto a docker.

In another embodiment of the present invention, there is provided a user interface dialog system comprising a tear-off function for tearing-off a dialog from a drop-down selection, and a dock function for docking the dialog on a docker.

In another embodiment of the present invention, there is provided an application framework comprising an application window, a drop-down system for dropping a dialog from a drop-down selection and for tearing-off the dialog from the drop-down selection, a docking system for docking the dialog on a docker and for floating the dialog on the window, and a merge function for converting a drop-down dialog into a dockable dialog.

In another embodiment of the present invention, there is provided a method for providing a user interface dialog. The method comprises steps of providing tear-off functionality for tearing-off the dialog from a drop-down system, and providing docking functionality for docking the dialog in a docker.

In another embodiment of the present invention, there is provided a method for providing a user interface dialog system. The method comprises steps of providing an application window for a user, providing a drop-down system for dropping a dialog from a drop-down selection and for tearing-off the dialog from the drop-down selection, providing a docking system for docking the dialog in a docker and for floating the dialog on the window, and providing a merge function for converting a drop-down dialog into a dockable dialog.

In another embodiment of the present invention, there is provided a method for adding a dialog to a docker. The method comprises steps of tearing-off the dialog from a drop-down selection, and docking the dialog to the docker.

In another embodiment of the present invention, there is provided a computer data signal embodied in a carrier wave that represents sequences of instructions which, when executed by a processor, cause the processor to perform a method for managing the user interface framework of a software application when installing a component in a software application. The method comprises steps of providing a tear-off function for tearing-off a dialog from a drop-down selection, and providing a dock function for docking the dialog in a docker.

In another embodiment of the present invention, there is provided computer-readable media for storing instructions or statements for use in the execution in a computer for a method of providing a user interface dialog system. The method comprises steps of providing a tear-off function for tearing-off the dialog from a drop-down selection, and providing a dock function for docking the dialog in a docker.

In another embodiment of the present invention, there is provided a computer program product for use in the execution in a computer for a user interface dialog system. The user interface dialog system comprises a tear-off function for tearing-off a dialog from a drop-down selection, and a dock function for docking the dialog in a docker.

BRIEF DESCRIPTION OF THE DRAWINGS

The invention will be further understood from the following description with reference to the drawings in which.

DETAILED DESCRIPTION OF EMBODIMENTS OF THE INVENTION

Some of the problems described above relate to user interface elements, such as drop-down dialogs and dockable dialogs used in application environments. In an embodiment of the present invention, a dockable drop-down dialog DDD, and a DDD system, are provided to allow for a dialog which is capable of dropping-down, floating and docking. In one example, the DDD system addresses the problems described above by providing a toolbar flyout button to flyout a fully functional modeless dialog. That dialog may also be torn-off the flyout button, floated in a window, and docked onto a docker. The fully functional modeless dialog is a dockable drop-down dialog. A DDD may be used as a drop-down dialog. A DDD may be used as a dockable dialog.

Figure 1:
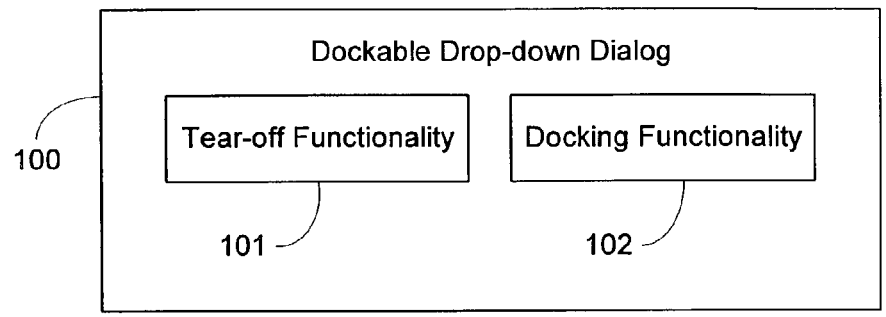
FIG. 1 is a diagram showing a dockable drop-down dialog.

FIG. 1 shows one example of a DDD 100 comprising tear-off functionality 101 and docking functionality 102. The tear-off functionality 101 allows the DDD 100 to be torn off of a drop-down selection. Examples of drop-down selections include drop-down menus, toolbars, control bars, flyout buttons or menus. The tear-off functionality 101 may be code which operates together with drop-down selections in an application environment. The docking functionality 102 allows the DDD 100 to be docked on a docker. The docking functionality 102 may be code which operates on dockers together within an application environment.

Figure 2:
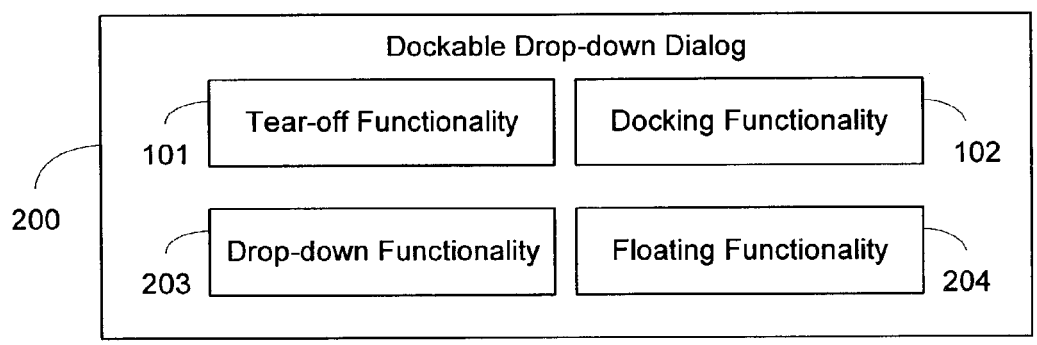
FIG. 2 is another diagram showing a dockable drop-down dialog.

FIG. 2 shows another example of a DDD 200 comprising tear-off functionality 101, docking functionality 102, drop-down functionality 203, and floating functionality 204. The tear-off functionality 101 and docking functionality 102 may be similar to those shown in FIG. 1. The drop-down functionality 203 allows the DDD 200 to drop-down from a drop-down selection. The floating functionality 204 allows the DDD 200 to float on an application window. An application window is the main user interface element which allows a user to interact with an application.

The remainder of the specification will describe embodiments of the invention with reference to the DDD 200. In suitable circumstances, the DDD 100 may be used in place of the DDD 200.

A DDD 200 may have traditional dockable dialog and traditional drop-down dialog features. These features may operate concurrently (modeless) or in alternating states (modal), i.e., when in drop-down mode, the DDD 200 does not dock. FIGS. 1 and 2 show an embodiment of a modeless DDD 100 and DDD 200 respectively. In an alternatively embodiment, a DDD 200 may be modal and further comprising dialog settings to enable and/or disable the modes. Such dialog settings may be one or more parameter values which reflect the state of the DDD 200. In one example, there may be one parameter settings comprising values which correspond to drop-down mode or docking mode. Other modes may be added to a DDD 200, such as a float mode. Such modes may also be enabled and disabled, operate concurrently with other states or operate independently in a single state mode. There may also be a value corresponding to a float mode to separate the floating feature from the drop-down mode and/or the dock mode. There may also be a value corresponding to an "all" mode which sets the DDD 200 to be able to drop-down, float, and dock. In addition, there may be other values corresponding to other features or combination of features of the DDD 200. Alternatively, each feature may have its own parameter setting which may be set to "on" or "off".

Figure 3:
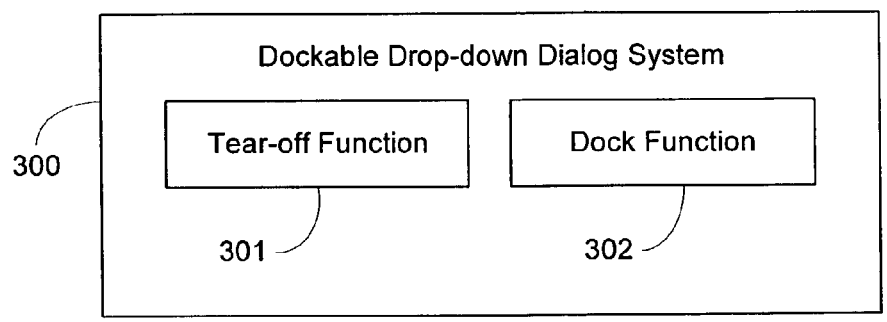
FIG. 3 is a diagram showing a dockable drop-down dialog system.

FIG. 3 shows an example of a DDD system 300 in accordance with an embodiment of the present invention. The DDD system 300 includes a tear-off function 301, and a dock function 302. The DDD system 300 may be part of an application environment or may operate as an independent application environment.

When part of an application environment, the application environment typically includes one or more functions that provide dialogs. One such function provides a drop-down dialog. Another function provides a dockable dialog. The DDD system 300 may call these functions provided by the application environment. The DDD system 300 may also comprise its own functions that provide drop-down dialogs, dockable dialogs, and/or DDDs 200. When operating as an independent application environment, the DDD system 300 typically comprises and calls its own dialog providing functions.

The tear-off function 301 allows a user to tear-off a DDD 200. The tear-off function 301 may be code which operates on drop-down selections in an application environment. The tear-off function 301 may include code which operates on drop-down dialogs in an application environment. The tear-off function 301 may include code which operates on DDDs 100 in an application environment. The tear-off function 301 may tear-off a drop-down dialog from a drop-down selection. The tear-off function 301 may tear-off a DDD 200 from a drop-down selection.

The dock function 302 allows a user to dock a DDD 200. The dock function 302 may be code which operates on dockers, and dockable dialogs including DDDs 100, in an application environment. The dock function 302 may dock a dockable dialog on a docker. The dock function 302 may dock a DDD 200 on a docker.

Figure 4:
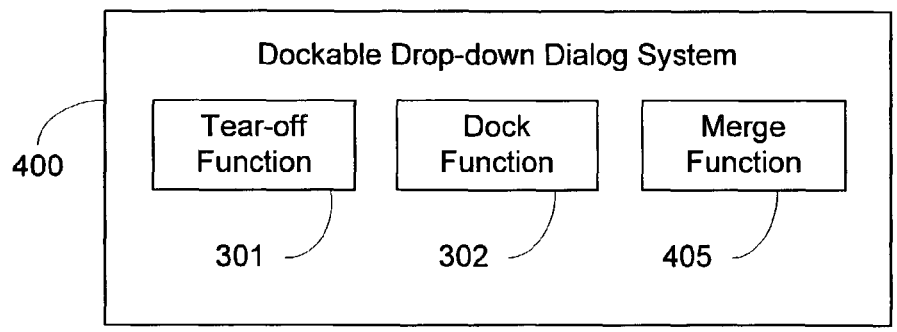
FIG. 4 is another diagram showing a dockable drop-down dialog system.

FIG. 4 shows another example of a DDD system 400 in accordance with an embodiment of the present invention. The DDD system 400 includes a tear-off function 301, a dock function 302, and a merge function 405. The DDD system 400 may be part of an application environment or may operate on an independent application environment. The tear-off function 301 and the dock function 302 may be similar to those shown in FIG. 3.

The merge function 405 allows a user to dock a drop-down dialog and/or a DDD 200. The merge function 405 may be code which operates on DDDs 200, drop-down dialogs and dockers in an application environment. A drop-down dialog may be converted into a dockable dialog or into a DDD 200. In one example, the merge function 405 may create an instance of a DDD 200 or an instance of a traditional dockable dialog and input all the values and attributes from an original drop-down dialog into the new instance. In another example, the merge function 405 may create an instance of a DDD 200 which references an original drop-down dialog. One skilled in the art will appreciate many different ways of accomplishing the goal of coding the transfer of the values and attributes from the original drop-down dialog to a new dockable dialog or DDD 200.

The merge function 405 may also be used to enable a docking ability in a DDD 200. In one example, a DDD 200 may be initially set in a drop-down dialog mode. The merge function 405 may set values or settings in a DDD 200 to enable a docking ability. The conversion or enabling may take place while the DDD 200 is attached to a drop-down selection, while the DDD 200 is torn-off from the drop-down selection, while the DDD 200 is floating in a window, while the DDD is dragged over a docker, and/or while the DDD 200 is dropped on the docker. For example, a DDD 200 may have dockability settings to enable or disable dockable mode, drop-down settings to enable or disable drop-down mode, and floatability settings to enable or disable floating mode. The merge function 405 may modify the mode settings to allow the user to dock a DDD 200. Alternatively, a function may be added to the DDD 200 or the DDD system 400 which allows a user to manually change the settings of the DDD 200.

Figure 5:
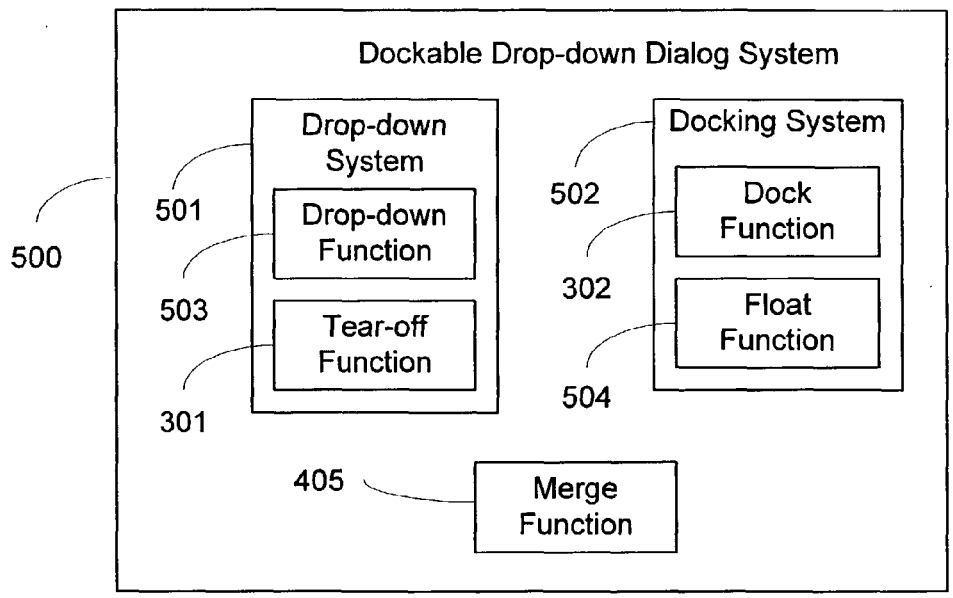
FIG. 5 is another diagram showing a dockable drop-down dialog system.

FIG. 5 shows another example of a DDD system 500. In this example, the DDD system 500 includes a drop-down system 501, a docking system 502, and merging functionality 405. The drop-down system 501 operates in an application environment to provide drop-down dialogs and/or DDDs 200. The docking system 502 operates in an application environment to provide dockers, dockable dialogs and/or DDDs 200. The merging functionality 405 may be similar to that described with reference to FIG. 4.

The drop-down system 501 includes a drop-down function 503 and a tear-off function 301. The drop-down system 501 allows a drop-down dialog and/or a DDD 200 to float in a window or be dropped-down from a drop-down selection. DDDs 200 may be torn-off from drop-down selections in the drop-down system 501 to float in a window in the drop-down system 501. The drop-down function 503 is for dropping a DDD 200 from a drop-down selection in the drop-down system 501. The drop-down system 501 and drop-down function 503 may be code which operates on drop-down selections, drop-down dialogs and/or DDDs 200 in an application environment. The tear-off function 301 may be similar to that described with reference to FIG. 3.

The docking system 502 includes a dock function 302 and a float function 504. The docking system 502 allows a dockable dialog and/or a DDD 200 to float in a window or be docked on a docker. DDDs 200 may be removed from the docker to float in the window. Floating DDDs 200 may be selected and docked on the docker. The float function 504 is for removing a DDD 200 from the docker and floating the DDD 200 in a window. The docking system 502 and float function 504 may be code which operates on dockers, dockable dialogs and/or DDDs 100 in an application environment. The dock function 302 may be similar to that described with reference to FIG. 3.

The remainder of the specification will describe embodiments of the invention with reference to the DDD system 500. In suitable circumstances, either the DDD system 300 or DDD system 400 may be used in place of the DDD system 500.

Figure 6:
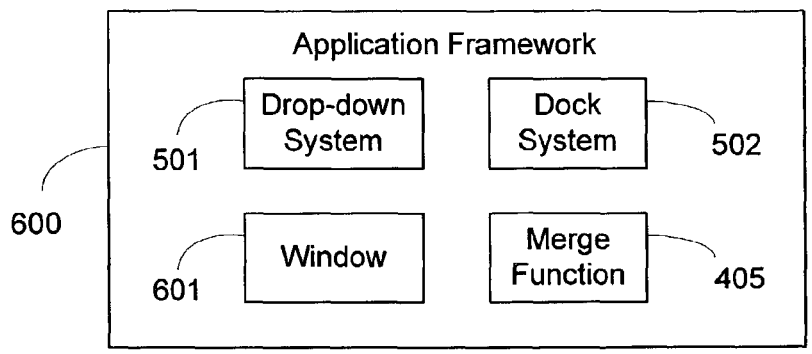
FIG. 6 is a diagram showing a dockable drop-down dialog system in an application framework.

FIG. 6 shows an application framework 600 in accordance with an example of an embodiment of the present invention. The application framework 600 includes an application window 601, a drop-down system 501, a docking system 502, and a merge function 405. The window 601 is the main user interface element which allows a user to interact with the application. The drop-down system 501, docking system 502, and merge function 405 are described above. In this example, the merge function 405 may be a separate component within the application framework 600.

Figure 7:
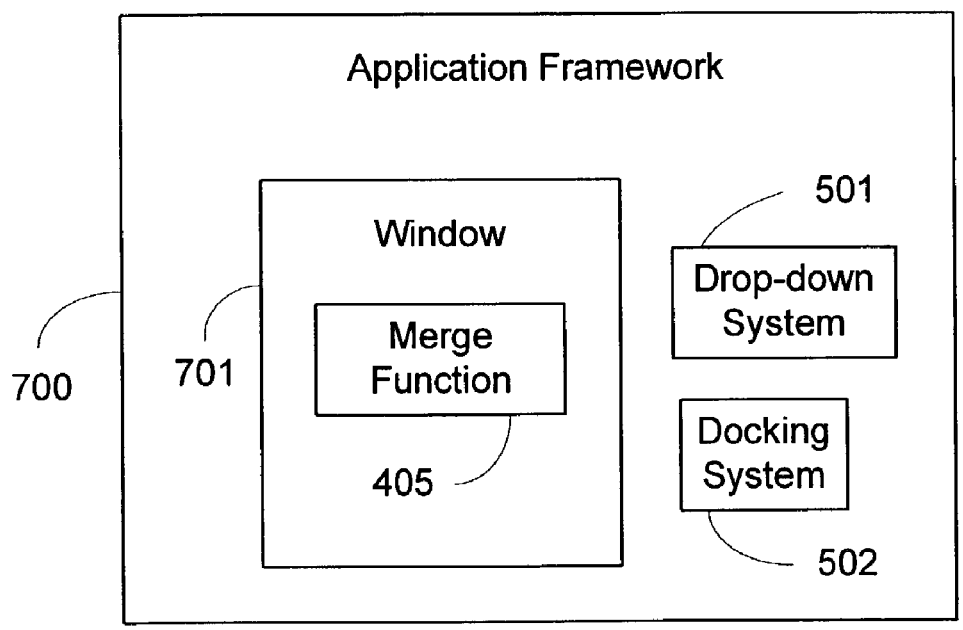
FIG. 7 is another diagram showing a dockable drop-down dialog system in an application framework.
Figure 8:
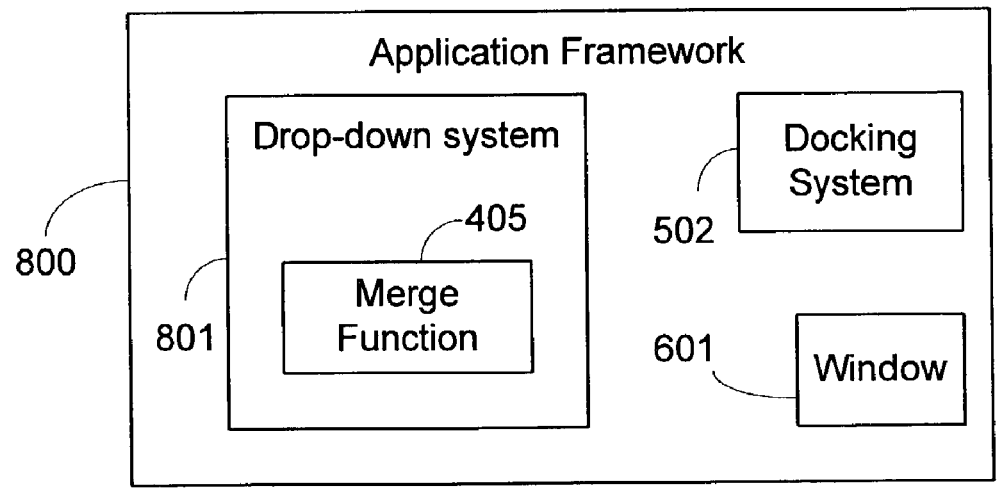
FIG. 8 is another diagram showing a dockable drop-down dialog system in an application framework.
Figure 9:
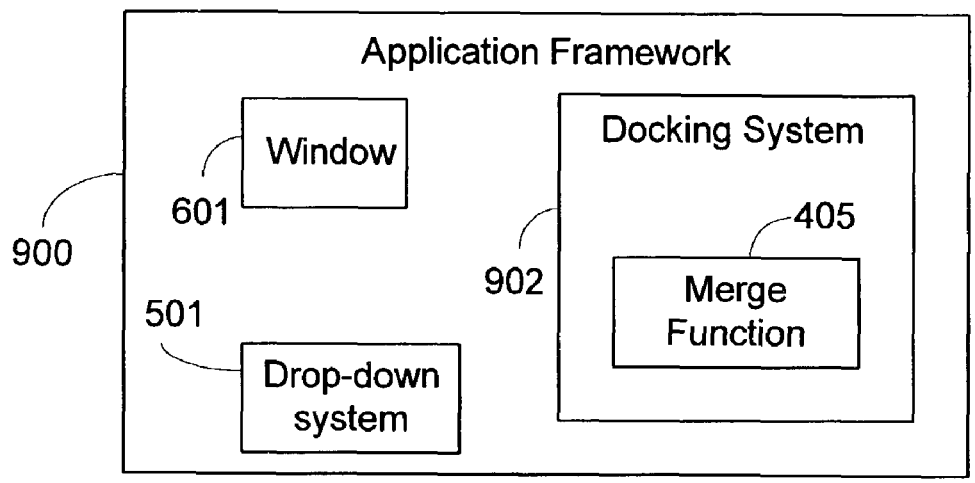
FIG. 9 is another diagram showing a dockable drop-down dialog system in an application framework.

FIGS. 7, 8, and 9 show other examples of an application framework 700, 800, and 900, respectively, in accordance with other embodiments of the present invention. The application framework 700 in FIG. 7 shows the merging functionality 405 as being a component within the window 701. The application framework 800 in FIG. 8 shows the merge function 405 as being a component within the drop-down system 801. The application framework 900 in FIG. 9 shows the merge function 405 as being a component within the docking system 902.

The remainder of the specification will describe embodiments of the invention with references to the window (or application window) 601, the drop-down system 501, and/or the docking system 502. In suitable circumstances, the window 701 may be used in place of the window 601, the drop-down system 801 may be used in place of the drop-down system 501, and the docking system 902 may be used in place of the docking system 502.

Figure 10:
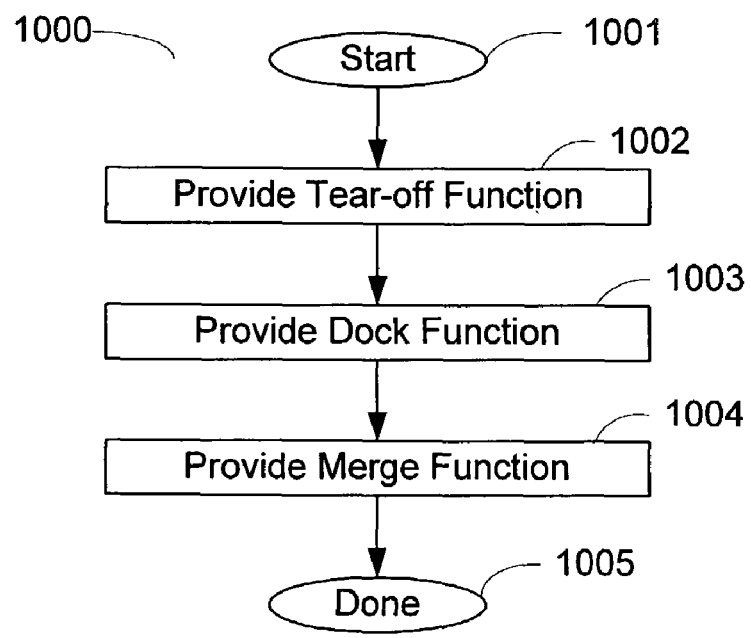
FIG. 10 is a flowchart showing a method of providing a dockable drop-down dialog system.

FIG. 10 shows a flow diagram for a method of providing a DDD system 500 (1000) according to another aspect of an embodiment of the present invention. After starting the method (1001) a tear-off function 301 is provided (1002). This tear-off function 301 may be code as described above. Next, a dock function 302 is provided (1003). This dock function 302 may be code as described above. Then a merge function 405 is provided (1004). This merge function 405 may be code as described above. These functions may be provided in any order. Once all three functions are provided, the method is done (1005).

Other steps may be included in the method for providing a DDD system 500 (1000). For example, a drop-down function 503 may be provided. The drop-down function 503 may be code as described above. Similarly, a float function 504 may be provided. This float function 504 may be code as described above. Again, the functions may be provided in any order.

Furthermore, the method may be modified to reflect an application framework 600. The steps here are to provide an application window 601, provide a docking system 502, provide a drop-down system 501, and provide a merge function 405. These items may be code as described above. These items may be provided in any order.

Figure 11:
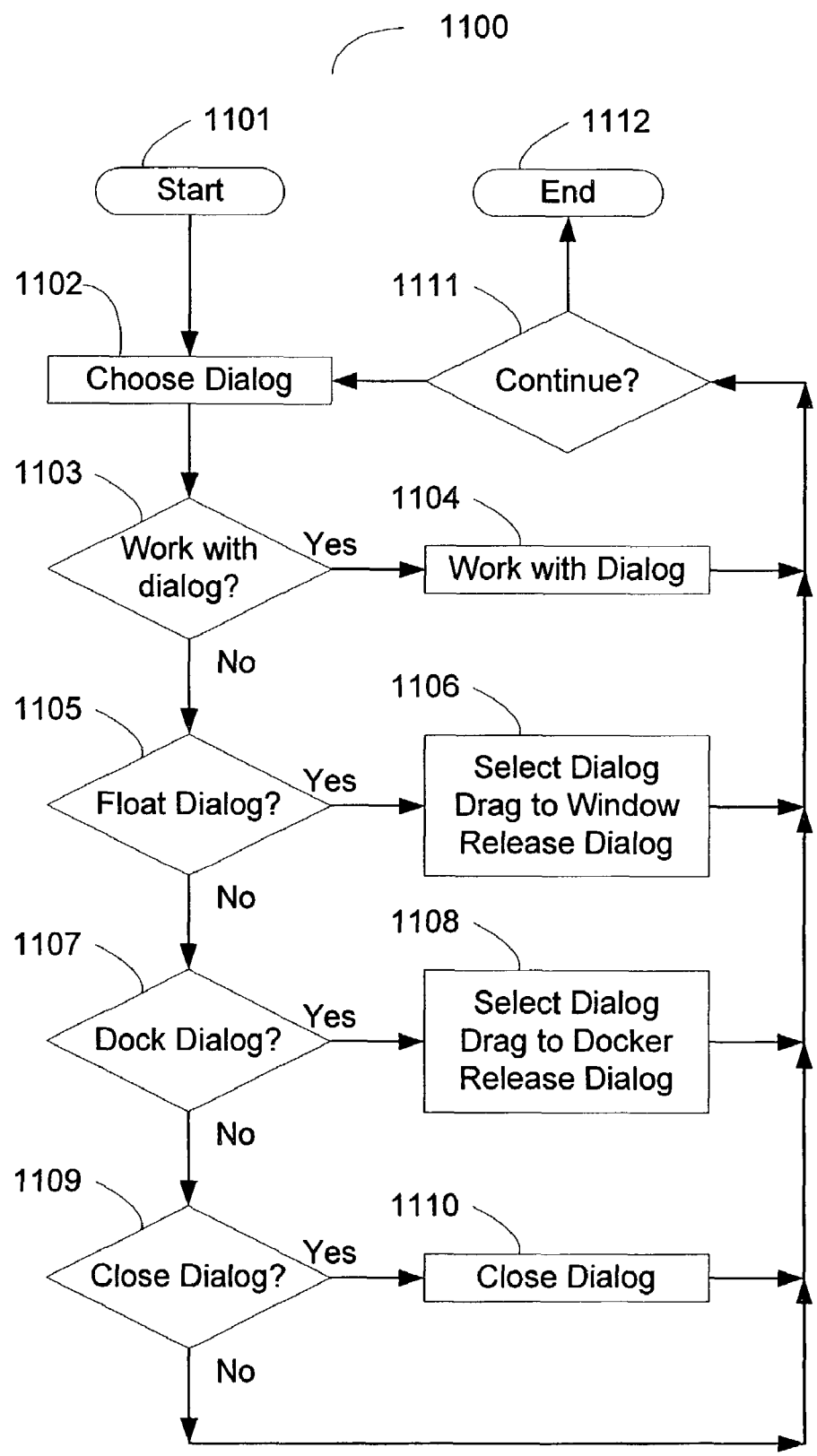
FIG. 11 is a flowchart showing a method of using a dockable drop-down dialog system.

FIG. 11 shows an example of a flowchart for using the DDD functionality (1100). Once a user decides to begin using the functionality (1101), the user chooses a dialog (1102). The selected dialog may be a floating dialog, a drop-down dialog, or a docked dialog, all of which may be a DDD 200. The floating dialog may be a drop-down dialog which has been torn-off, a dockable dialog which has been removed from the docker, or a DDD 200. The user may perform several actions with the dialog. The user may work with the dialog, close the dialog, float the dialog, or dock the dialog. Any number of these actions may be performed in any order and any number of times. For convenience, the actions will be described in the order provided in FIG. 11.

The user may decide to work with the dialog (1103). The user then works with the dialog (1104) at its location. If it is a floating dialog, the user may work with the dialog on top of the application window 601 or even on top of operating system desktop. If it is a docked dialog, the user may work with the dialog on the docker. If it is a drop-down dialog, the user may work with the dialog adjacent to its drop-down selection.

When the user is finished working with the dialog, the user may decide not to continue with another operation (1111). If so, the process ends (1112). Otherwise, the user may select another dialog or reselect the same dialog (1102). Had the user decided not to work with the dialog (1103), then the user may decide to perform another action with the dialog.

The user may decide to float the dialog on top of the application window 601 or desktop (1105). If the user originally chose (1102) a drop-down dialog or a DDD 200, on a drop-down selection, then the user selects the dialog, drags the dialog to the application window 601 or desktop, and releases the dialog (1106) to float. If the user originally chose (1102) a dockable dialog or a DDD 200, on a docker, then the user selects the dialog, drags the dialog to float it on the application window 601 or desktop, and releases the dialog (1106). The select and drag functions may be performed using any input device, including a mouse or a stylus pen. The select and drag on a drop-down dialog or a DDD 200, tear-offs the dialog from the drop-down selection. The select and drag on a dockable dialog or a DDD 200, removes the dialog from the docker. The release function over the application window 601 or desktop causes the dialog to float on top, or the foreground, of the application window 601 or desktop.

Once the dialog is floating, the user may decide not to continue with another operation (1111). If so, the process ends (1112). Otherwise, the user may select another dialog or reselect the same dialog (1102). If the user decides not to float the dialog (1105), or if the dialog is already floating, then the user may decide to perform another action with the dialog.

The user may decide to dock the dialog. If the user originally chose (1102) a drop-down dialog or a DDD 200, on a drop-down selection, or if the user originally chose (1102) a floating drop-down dialog, a floating dockable dialog, or a floating DDD 200, then the user selects the dialog, drags the dialog to a docker, and releases the dialog (1108) to dock. The select and drag functions may be performed using any input device, including a mouse or a stylus pen. The release function over the docker causes the dialog to dock. At any time during this process, a drop-down dialog may be converted into a DDD 200 or a dockable dialog. This conversion may be performed automatically by the code. Alternatively, an extra step may be inserted allowing a user to request the conversion.

Once the dialog is docked, the user may decide not to continue with another operation (1111). If so, the process ends (1112). Otherwise, the user may select another dialog or reselect the same dialog (1102). If the user decides not to dock the dialog (1107), or if the dialog is already docked, then the user may decide to perform another action with the dialog.

The user may decide to close the dialog (1109). If the dialog is a drop-down dialog or a DDD, and is adjacent to a drop-down selection, then the user may close the dialog (1110) by clicking on a part of the window not covered by the dialog. Alternatively, or if the dialog is floating or docked, the user may close the dialog (1110) by clicking on a close or exit button on the dialog. This button may be located in the top right hand corner of the dialog or in another location.

Once the dialog is closed, the user may decide not to continue with another operation (1111). If so, the process ends (1112). Otherwise, the user may select another dialog (1102). Alternatively, the same dialog may be stored in a memory for the user to reselect (1102). Had the user decided not to close the dialog (1109), then the user may decide to perform another action with the dialog.

Other actions may be performed on dialogs. The embodiment shown in FIG. 11 allows for the situation where there is no action to be chosen. In such a scenario, the user has the option to continue with another operation (1111). If the user decides not to continue (1111), then the process ends (1112). Alternatively, the process may be set to end after the last action listed is rejected. In a different embodiment, the decision making process may be structured differently. For example, a tree structure outlining possible combinations of actions to dialogs, and types of dialogs, may be used.

A subset of FIG. 11 shows a flowchart for using the DDD functionality (1100) to dock a DDD 200 from a drop-down selection. In this example, the options to work with (1103), float (1105), and close (1109) the dialog may be omitted. Once a user decides to begin using the functionality (1101), the user may select a DDD 200 from a drop-down selection (1102). The user may choose to dock the DDD 200 (1107). The user may select and drag the DDD 200 to the docker and release the DDD 200 to dock on the docker (1108). In this scenario, the DDD 200 has been torn-off and docked. The user may now work with (1104) the docked DDD 200.

Another subset of FIG. 11 shows a flowchart for using the DDD functionality (1100) to float and then dock a DDD 200 from a drop-down selection. In this example, the options to work with (1103), and close (1109) the dialog may be omitted. Once a user decides to begin using the functionality (1101), the user may select a DDD 200 from a drop-down selection (1102). The user may then choose to float the DDD (1105). The user then selects and drags the DDD 200 to the application window 601 or desktop and releases the DDD 200 to float on top of the application window 601 or desktop (1106). The user may now work with (1104) the floating DDD 200. If the user desires to dock the floating DDD 200, the user may decide to dock the DDD 200 (1107). The user now selects the DDD 200 which is floating on top of the application window 601 or desktop, drags the DDD 200 to the docker and releases the DDD 200 to dock in the docker (1108). In this scenario, the DDD 200 has been torn-off, floated and docked. The user may now work with (1104) the docked DDD 200.

Other subsets of FIG. 11 may be used to show other combinations for using DDD funtionality (1100). Subsets of FIG. 11 may also be used to show the respective uses of the DDD system functionality on drop-down dialogs and dockable dialogs.

Figure 12:
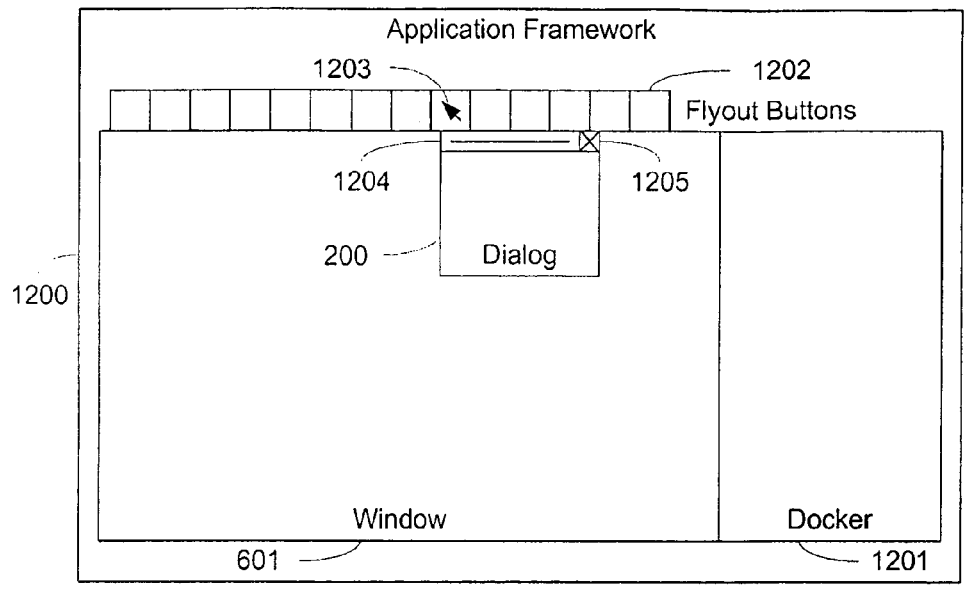
FIG. 12 is a pictorial view of an application framework.

Referring to FIGS. 12 to 17, examples of the use of an embodiment of the present invention are described. FIG. 12 shows an application framework 1200, flyout buttons 1202, the application window 601, a docker 1201, and a DDD 200. A docker 1201 is a fixed area in the application window 601. FIG. 12 shows a cursor 1203 on a flyout button 1202. In this example, using a mouse to click the cursor 1203 on a flyout button 1202 activates a DDD 200. The DDD 200 may be torn-off and either floated or docked to the frame of the application. To depict that the ability to tear-off a DDD 200 from a drop-down dialog is allowed, any indication may appear on any part of the DDD 200. For example, the indication may appear as a gripper bar across the top of the DDD 200.

FIG. 12 shows the DDD 200 containing a gripper bar 1204 and an exit button 1205. When initially flown out, a DDD 200 may be automatically dismissed by clicking on a location in the application window 601 not covered by the DDD 200 or on the desktop. Alternatively, the DDD 200 may be dismissed by clicking the exit button 1205. A user may use the DDD 200, dismiss it or tear it off the flyout button 1202.

Figure 13:
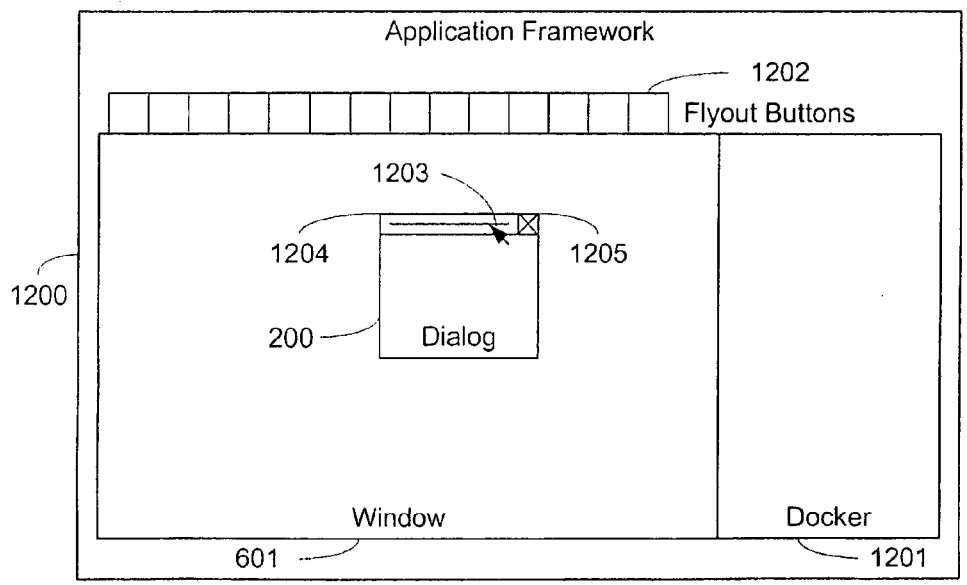
FIG. 13 is another pictorial view of an application framework.

FIG. 13 shows an example of tearing-off the dialog 100. In one example of an embodiment, a mouse is used to click the cursor 1203 on the gripper 1204 of the DDD 200. Alternatively, a stylus or pointing pen, or any other input device, may be used. Next, the DDD 200 is dragged to a location on top of the application window 601 or desktop in the conventional click and drag operation of a mouse in a computer system known by a person skilled in the art. Releasing the mouse button releases the DDD 200 to float on top of the application window 601 or desktop. Once torn-off and floating, the DDD 200 may have a typical window title bar. When torn-off, and either floating or docked, the DDD 200 may have an exit button 1205. For example, the exit button 1205 may be in the top corner of the DDD 200.

Figure 14:
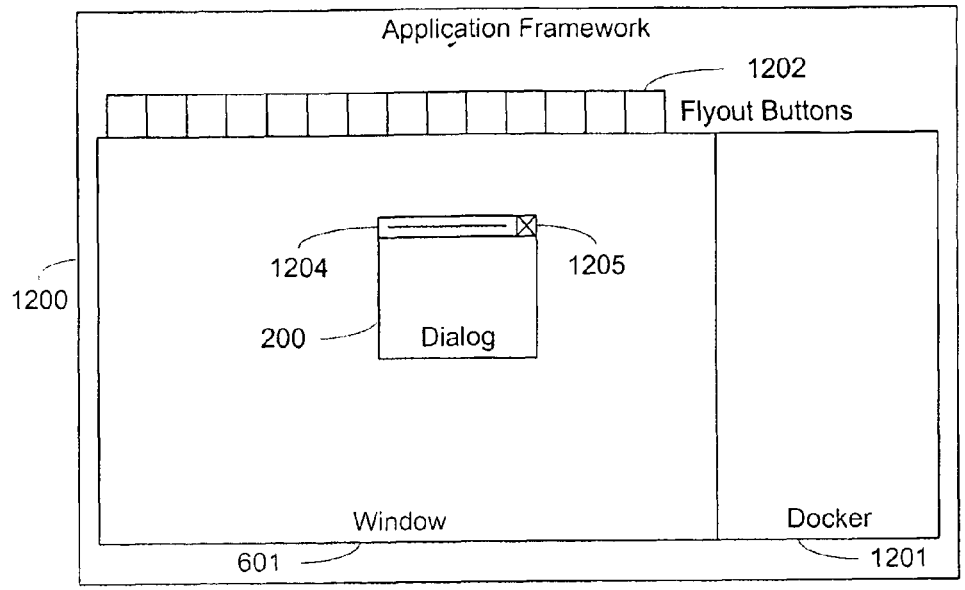
FIG. 14 is another pictorial view of an application framework.
Figure 15:
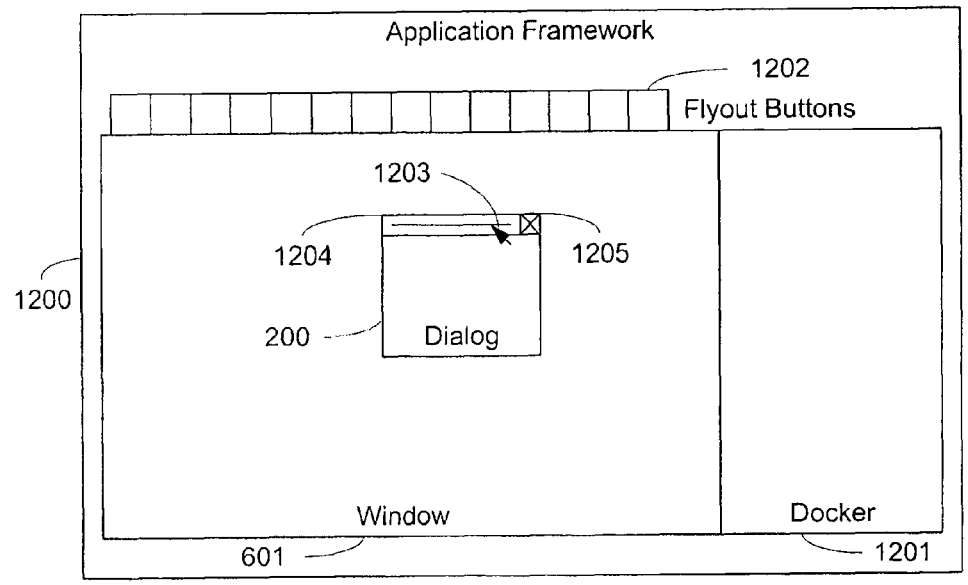
FIG. 15 is another pictorial view of an application framework.

FIG. 14 shows an example of a DDD 200 floating on top of the application window 601. A user may use the floating DDD 200, close it, or dock it to the docker 1201. FIG. 15 shows a cursor 1203 clicked on the gripper 1204 of the floating DDD 200. The DDD 200 may be dragged to the docker 1201.

Figure 16:
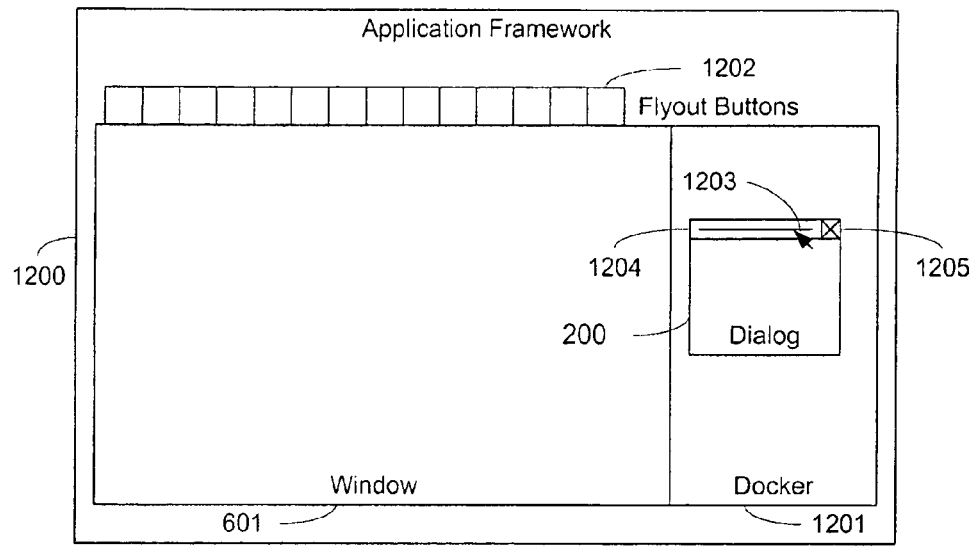
FIG. 16 is another pictorial view of an application framework.
Figure 17:
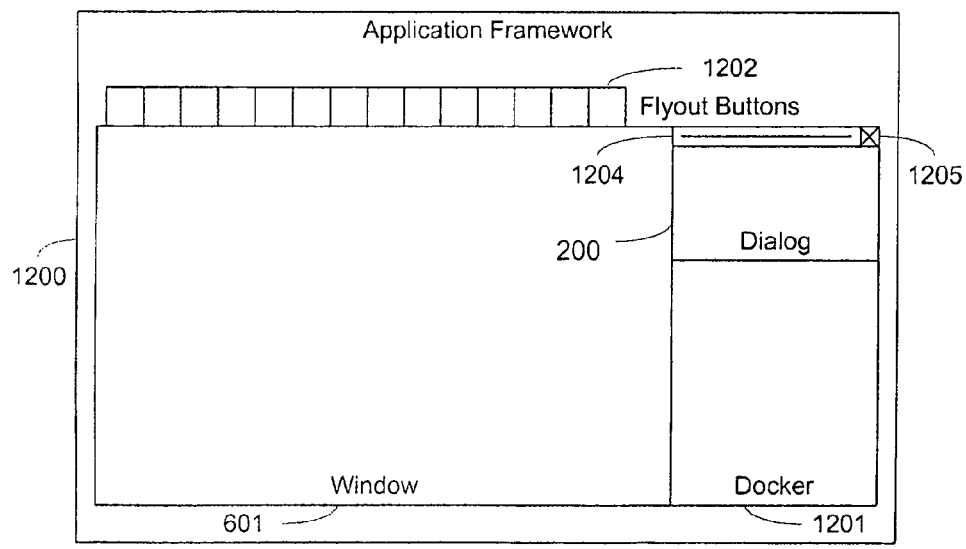
FIG. 17 is another pictorial view of an application framework.

FIG. 16 shows the DDD 200 dragged over the docker 1201. Releasing the DDD 200 on the docker 1201 docks the DDD 200. FIG. 17 shows an example of an embodiment where once released, the location of the DDD 200 is arranged by the docker to a suitable location on the docker 1201. In this example, the DDD 200 is docked on the top of the docker 1201. The suitable location may be customizable with user setting preferences. Alternatively, the DDD 200 may simply be docked at the location where the user released the DDD 200 on the docker 1201. A user may use the DDD 200, leave it on the docker 1201, or close it.

FIGS. 12 to 17 may also be used to show examples of other embodiments of the invention. The flyout buttons 1202 are replaced with other types of drop-down selections. The flyout buttons 1202 or other drop-down selections may provide drop-down dialogs which may be converted to dockable dialogs or DDDs 100 as described above, and docked on the docker 1201. Furthermore, dialogs docked on the docker 1201 may be removed from the docker 1201 to float in the window 601.

With the DDD system 500, the use of dialogs throughout the user interface may be streamlined and enhanced. One way in which the user interface may be streamlined and enhanced includes the fact that the DDD 200 may be set to be shown directly adjacent to the flyout button 1202 or drop-down selection invoking it, shortening mouse movement, and covering less of the working screen area. Another way in which the user interface may be streamlined and enhanced includes the fact that if not torn-off, the DDD 200 may be set to automatically be dismissed by selecting another location in the application window 601 or desktop with the cursor 1203, saving time for cases where the DDD 200 is invoked frequently with only small operations being done in the DDD 200. Another way in which the user interface is streamlined and enhanced includes the fact that tearing the DDD 200 off and placing it anywhere on the screen allows the user to customize the workspace. Another way in which the user interface may be streamlined and enhanced includes the fact that if it is docked, the DDD 200 may be set to stay in one place relative to the parent application while maximizing useable screen space.

Advantages of the DDDs 100 include improved workflow since users may use DDDs 100 in both a drop-down environment and a docking environment. Another advantage is less confusion and frustration for users since they now dock a pull-down dialog.

The DDD 100, DDD 200, DDD system 300, DDD system 400, and DDD system 500 in the present invention may each be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While specific embodiments of the present invention have been described, various modifications and substitutions may be made to such embodiments. Such modifications and substitutions are within the scope of the present invention, and are intended to be covered by the following claims.

What is claimed is:

1. An application framework implemented in a computer having a processor for executing instructions stored in non-transitory tangible computer readable memory, the instructions when executed providing:
   an application window relating to an application provided on a predetermined portion of a display forming part of the computer system having:
   a working area comprising a first predetermined portion of the application window; and
   a docker designated area comprising a second predetermined portion of the application window, the second predetermined portion being less than a complete area of the application window;
   one or more flyout buttons for activating a dockable drop-down dialog;
   a drop-down system including:
   drop-down functionality for dropping a dialog, as the dockable drop-down dialog, from the one or more flyout buttons, wherein the dialog presents a plurality of user interface components allowing the user to work with the dialog; and
   tear-off functionality for tearing-off the dockable drop-down dialog;
   a docking system including:
   floating functionality for floating the torn-off dockable drop-down dialog on the working area of the application window; and
   docking functionality for docking the torn-off dockable drop-down dialog within the docker designated area of the application window, the docking functionality automatically arranging the location of the dockable drop-down dialog within the docker designated area, and
   a merge function for selectively enabling and disabling the docking functionality for the dockable drop-down dialog with the docker designated area.

2. The application framework as claimed in claim 1, wherein the application window comprises the merge function.

3. The application framework as claimed in claim 1, wherein the drop-down system comprises the merge function.

4. The application framework as claimed in claim 1, wherein the docking system comprises the merge function.

5. The application framework as claimed in claim 1, wherein the dialog comprises a non-linear layout of user interface controls.

6. The application framework as claimed in claim 1 wherein, the docking functionality reconfigures the dockable drop-down dialog within the docker designated area in response to a resizing of the application window.

7. A method for providing a user interface dialog system, the method comprising steps of:
providing an application window relating to an application provided on a predetermined portion of a display having:
a working area comprising a first predetermined portion of the application window; and
a docker designated area comprising a second predetermined portion of the application window, the second predetermined portion being less than a complete area of the application window;
providing one or more flyout buttons for activating a dockable drop-down dialog;
providing a drop-down system including:
drop-down functionality for dropping a dialog, as the dockable drop-down dialog, from the one or more flyout buttons, wherein the dialog presents a plurality of user interface components allowing the user to work with the dialog; and
tear-off functionality for tearing-off the dockable drop-down dialog; providing a docking system including:
floating functionality for floating the tom-off dockable drop-down dialog on the working area of the application window; and
docking functionality for docking the tom-off dockable drop-down dialog within the docker designated area of the application window, the docking functionality automatically arranging the location of the dockable drop-down dialog within the docker designated area, and
providing a merge function for selectively enabling and disabling the docking functionality for the dockable drop-down dialog with the docker designated area.

8. The method as claimed in claim 7, wherein the merge function is provided in the application window.

9. The method as claimed in claim 7, wherein the merge function is provided in the drop-down system.

10. The method as claimed in claim 7, wherein the merge function is provided in the docking system.

11. The method as claimed in claim 7, wherein the dialog comprises a non-linear layout of user interface controls.

12. The method as claimed in claim 7 wherein, reconfigures the dockable drop-down dialog within the docker designated area in response to a resizing of the application window.

13. One or more non-transitory tangible computer-readable storage media for storing instructions or statements for use in the execution in a computer of a method for providing a user interface dialog system, the method comprising steps of:
providing an application window relating to an application provided on a predetermined portion of a display forming part of the computer system having:
a working area comprising a first predetermined portion of the application window; and
a docker designated area comprising a second predetermined portion of the application window, the second predetermined portion being less than a complete area of the application window;
providing one or more flyout buttons for activating a dockable drop-down dialog;
providing a drop-down system including:
drop-down functionality for dropping a dialog, as the dockable drop-down dialog, from the one or more flyout buttons, wherein the dialog presents a plurality of user interface components allowing the user to work with the dialog; and
tear-off functionality for tearing-off the dockable drop-down dialog;
providing a docking system including:
floating functionality for floating the tom-off dockable drop-down dialog on the working area of the application window; and
docking functionality for docking the tom-off dockable drop-down dialog within the docker designated area of the application window, the docking functionality automatically arranging the location of the dockable drop-down dialog within the docker designated area, and
providing a merge function for selectively enabling and disabling the docking functionality for the dockable drop-down dialog with the docker designated area.

14. The one or more non-transitory tangible computer-readable storage media for storing instructions or statements for use in the execution in a computer of a method for providing a user interface dialog system as claimed in claim 13 wherein, the docking functionality reconfigures the dockable drop-down dialog within the docker designated area in response to a resizing of the application window.

15. A computer program product comprising instructions stored on a non-transitory computer readable medium for use in the execution in a computer for providing a user interface dialog system, the user interface dialog system comprising:
an application window associated with an application provided on a predetermined portion of a display forming part of the computer having:
a working area comprising a first predetermined portion of the application window; and
a docker designated area comprising a second predetermined portion of the application window, the second predetermined portion being less than a complete area of the application window;
one or more flyout buttons for activating a dockable drop-down dialog; a drop-down system including:
drop-down functionality for dropping a dialog, as the dockable drop-down dialog, from the one or more flyout buttons, wherein the dialog presents a plurality of user interface components allowing the user to work with the dialog; and
tear-off functionality for tearing-off the dockable drop-down dialog;
a docking system including:
floating functionality for floating the tom-off dockable drop-down dialog on the working area of the application window; and
docking functionality for docking the tom-off dockable drop-down dialog within
the docker designated area of the application window, the docking functionality automatically arranging the location of the dockable drop-down dialog within the docker designated area, and
a merge function for selectively enabling and disabling the docking functionality for the dockable drop-down dialog with the docker designated area.

16. The computer program product comprising instructions stored on a non-transitory computer readable medium for use in the execution in a computer for providing a user interface dialog system as claimed in claim 15 wherein, the docking functionality reconfigures the dockable drop-down dialog within the docker designated area in response to a resizing of the application window.

* * * * *